United States Patent
Dominguis Botella et al.

(10) Patent No.: US 11,118,676 B2
(45) Date of Patent: Sep. 14, 2021

(54) GEAR SELECT MODULES WITH INTENTION DETECTOR

(71) Applicant: Fico Triad, S.A., Barcelona (ES)

(72) Inventors: Marc Dominguis Botella, Barcelona (ES); Josep Maria Batlle Martin, Barcelona (ES); Jaume Ferré Ripoll, Barcelona (ES)

(73) Assignee: FICO TRIAD, S.A., Barcelona (ES)

( * ) Notice: Subject to any disclaimer, the term of this patent is extended or adjusted under 35 U.S.C. 154(b) by 309 days.

(21) Appl. No.: 16/315,544

(22) PCT Filed: Jul. 4, 2016

(86) PCT No.: PCT/EP2016/065718
§ 371 (c)(1),
(2) Date: Jan. 4, 2019

(87) PCT Pub. No.: WO2018/006934
PCT Pub. Date: Jan. 11, 2018

(65) Prior Publication Data
US 2019/0331215 A1    Oct. 31, 2019

(51) Int. Cl.
*F16H 61/00* (2006.01)
*F16H 59/02* (2006.01)
(Continued)

(52) U.S. Cl.
CPC ......... *F16H 61/0006* (2013.01); *F16H 59/02* (2013.01); *F16H 61/16* (2013.01); *F16H 61/24* (2013.01); *F16H 2061/241* (2013.01)

(58) Field of Classification Search
CPC ...... F16H 61/0006; F16H 59/02; F16H 61/16; F16H 61/24; F16H 2061/241
See application file for complete search history.

(56) References Cited

U.S. PATENT DOCUMENTS

| 2003/0141130 A1 | 7/2003 | Fleming et al. | |
| 2004/0054446 A1* | 3/2004 | Sanpei | B60H 1/0065 701/1 |

(Continued)

FOREIGN PATENT DOCUMENTS

| EP | 1617106 A2 | 1/2006 |
| WO | 2009133533 A2 | 11/2009 |

OTHER PUBLICATIONS

International Search Report and Written Opinion dated Apr. 7, 2017 for PCT Application No. PCT/EP2016/065718, 17 pgs.

*Primary Examiner* — David M Fenstermacher
(74) *Attorney, Agent, or Firm* — Brooks Kushman P.C.

(57) ABSTRACT

Gear Select Modules (GSMs) are proposed. The GSMs comprise a GSM controller, an intention detector to detect a gear shift movement intention of a driver, a haptic human machine interface (HMI), in communication with the GSM controller and a gear shifting mechanism. The GSM controller is configured to autonomously instruct the haptic HMI to control the gear shifting mechanism between detection of the gear shift change intention and until the GSM controller receives an actuation signal from a transmission control module (TCM). Automatic powertrain command systems with the proposed GSMs are also proposed and also vehicles with the proposed automatic powertrain command systems.

20 Claims, 8 Drawing Sheets

(51) Int. Cl.
*F16H 61/16* (2006.01)
*F16H 61/24* (2006.01)

(56) References Cited

U.S. PATENT DOCUMENTS

| | | | |
|---|---|---|---|
| 2004/0266583 A1* | 12/2004 | Henneken | F16H 61/0213 477/34 |
| 2006/0236800 A1* | 10/2006 | Yone | F16H 61/24 74/336 R |
| 2009/0248260 A1* | 10/2009 | Flanagan | F16H 61/24 701/51 |
| 2012/0232765 A1 | 9/2012 | Holub et al. | |
| 2014/0236435 A1 | 8/2014 | Habenschaden | |
| 2015/0198235 A1* | 7/2015 | Baumgartner | B60W 50/082 701/52 |
| 2016/0245405 A1* | 8/2016 | Petridis | F16H 63/42 |
| 2016/0257197 A1* | 9/2016 | Fader | F16H 61/68 |
| 2017/0120930 A1* | 5/2017 | Ling | G06F 3/017 |
| 2019/0063596 A1* | 2/2019 | Dubay | F16H 61/22 |
| 2019/0168764 A1* | 6/2019 | Hall | B60W 10/06 |
| 2019/0299994 A1* | 10/2019 | Awana | B60W 30/188 |
| 2019/0323620 A1* | 10/2019 | Sakautzky | F16K 31/05 |
| 2019/0331215 A1* | 10/2019 | Dominguis Botella | F16H 61/24 |
| 2020/0263785 A1* | 8/2020 | Perez | F16H 61/24 |
| 2020/0400227 A1* | 12/2020 | Kang | F16H 59/10 |

\* cited by examiner

GEAR SELECT MODULES WITH INTENTION DETECTOR

CROSS-REFERENCE TO RELATED APPLICATION

This application is the U.S. national phase of PCT Application No. PCT/EP2016/065718 filed on Jul. 4, 2016, the disclosures of which is incorporated in its entirety by reference herein.

TECHNICAL FIELD

The present disclosure relates to methods and devices for intention detection in gear select modules.

BACKGROUND

Automatic Powertrain Command Systems (APCD) of vehicles typically employ multistable positions, such as P (Park), R (Reverse), N (Neutral), D (Drive) and L (Low).

Most current systems use a Gear Select Module (GSM) slave node. In these systems, the GSM may be a slave node and the vehicle may have a transmission control module (TCM) with master functions over the GSM. The GSM slave node may use different electronic transmission systems to communicate with the TCM (for example, a Controller Area Network (CAN) bus, a Local Interconnect Network (LIN), electrical signals, etc.). Based on the TCM's internal implemented strategy, the TCM may command the GSM slave node by sending electronic information. The TCM's internal strategy may rely on the status of different sensors and vehicle information. In current systems, the GSM slave node may only respond after receipt of a command or instruction from the TCM. Such instructions are not in real time and are typically received after at least 100 ms have passed. This is because, typically, the GSM slave node reacts to master related functions only after the TCM receives status data from sensors, processes such data, selects the status to be updated, sends the command to the GSM slave node and such command is received by the GSM.

This process implies a delay that does not allow a real time reaction (defined as a reaction at a time shorter than 30 ms) at the GSM slave node.

It would be desirable to provide a powertrain architecture that at least partially resolves the above mentioned problems.

SUMMARY

A new powertrain architecture is proposed. In the proposed powertrain architecture the GSM is not a mere slave unit. The proposed GSM comprises functionality that permits actuation without having to wait for the TCM's response.

In a first aspect, a GSM is disclosed. The GSM comprises a GSM controller, an intention detector, coupled to the GSM controller, to detect an intention of a driver to change the gear shift, a haptic human machine interface (HMI), in communication with the GSM controller, and a gear shifting mechanism. The gear shifting mechanism comprises a gear shift. The GSM controller is configured to autonomously instruct the haptic HMI to control the gear shifting mechanism between detection of the gear shift change intention and until the GSM controller receives an actuation signal from a transmission control module (TCM).

By providing the GSM with gear shift controlling capabilities until reception of an actuation signal from the TCM, it is possible to provide haptic feedback to the driver in real time (i.e. in less than 30 ms) and until the actuation signal arrives from the TCM which typically takes more than 100 ms. Thus, damage to the GSM may be avoided by an accidental invalid gear shift change. The GSM controller may be configured to transmit the detected gear shift intention to the TCM and receive the TCM actuation signal in response. However, the GSM controller may implement its own autonomous control strategy while waiting for the response of the TCM.

To implement the autonomous control strategy the haptic HMI may comprise an actuator. In some examples, the actuator may be one or more of a stop movement module, a force feedback module and a vibration module. Depending on the intention detected, a different module may actuate on the driver or a combination of modules. The reaction may be based on signals or information provided by different sensors and vehicle status information (e.g. speed of the vehicle).

In some examples, the haptic HMI may be controllable through a pulse width modulation (PWM) signal. It may provide haptic feedback to the driver in almost real time, i.e. in less than 30 ms.

In some examples, the gear shifting mechanism may be controllable through the haptic HMI between an off position corresponding to 0% of the PWM signal's duty cycle and a block position corresponding to 100% of the PWM signal's duty cycle. This may depend on the type of change intention, speed of gear movement (gear speed) or on the vehicle status (vehicle speed).

In some examples, the intention detector may comprise a movement detector or an accelerometer. It may detect movement of the gear which may correspond to an intention to change shift. Additionally or alternatively, the intention detector may comprise one or more of (i) a touch sensor, to identify a contact the driver may make with the gear shift, (ii) a proximity sensor, to identify an approaching movement of the driver, e.g. of the hand of the driver, towards the gear shift, (iii) a temperature sensor, to identify a change in the temperature at the gear shift as indicative of an intention to move the gear shift, and (iv) a pressure sensor, to identify a gripping action of the driver's hand as indicative of an intention to move the gear shift. In some examples, the gear shift may comprise a knob and the touch sensor; the proximity sensor, the temperature sensor and/or the pressure sensor may be located at the knob.

In some examples, the GSM controller may comprise a table of prohibited position shift definitions. The table may include positions not allowed under specific vehicle conditions. For example, the table may have the following form:

TABLE 1

General table of prohibited changes

| Current Position | Vehicle Speed | Direction | Position not allowed |
|---|---|---|---|
| Reverse (R) | Above 3 Km/h | Backward | Park (P) |
| Reverse (R) | Above 3 Km/h | Backward | Drive (D) |
| Neutral (N) | Above 3 Km/h | Forward | Park (P) |
| Neutral (N) | Above 3 Km/h | Forward | Reverse (R) |
| Neutral (N) | Above 3 Km/h | Backward | Park (P) |
| Neutral (N) | Above 3 Km/h | Backward | Drive (D) |
| Drive (D) | Above 3 Km/h | Forward | Park (P) |
| Drive (D) | Above 3 Km/h | Forward | Reverse (R) |

In some examples, the GSM controller may comprise an invalid position shift detector. The invalid position shift detector may qualify a gear shift intention as an invalid position shift according to the vehicle's condition at the time of the shift intention.

In some examples, the GSM controller may comprise a gear speed detector. The gear speed detector may detect the speed of a gear movement and accordingly the haptic HMI may increase the difficulty of gear shift movement or block the movement completely.

In some examples, the GSM controller may comprise a proportional-derivative (PD) controller. The PD controller may allow the increase in difficulty of change.

In another aspect, an automatic power train command (APTC) system is disclosed. The APTC system may comprise a GSM according to examples disclosed herein and a TCM in communication with the GSM through a communication channel coupling the GSM and the TCM. The communication channel may be a wired or wireless channel.

In yet another aspect, a vehicle is disclosed. The vehicle may comprise an APTC system according to examples disclosed herein.

In yet another aspect, a method of controlling vehicle gear shifting at a GSM is disclosed. The method may comprise identifying a current gear shift position, identifying an intention to change gear shift position to a new gear shift position and executing a GSM autonomous control strategy in response to the identifying between detection of the gear shift change intention and until reception of an actuation signal from a TCM.

In some examples, the method may further comprise transmitting the identified intention to the TCM, receiving a control strategy from the TCM, and switching from the GSM autonomous control strategy to the TCM control strategy when the TCM control strategy is received. The switching may allow for a safer gear shift change in case a driver intends an inappropriate shift change quicker than the TCM may react.

In some examples of the method, identifying an intention to change shift position may comprise identifying the change from the current gear shift position to the new gear shift position as a prohibited intention to change or identifying a prohibited vehicle state for the intention to change.

In some examples of the method, identifying an intention to change as a prohibited change may comprise looking up a table with prohibited gear shift change position pair. Identifying a prohibited vehicle state for the intention to change may comprise identifying the vehicle's speed.

In some examples of the method, identifying an intention to change gear shift position to a new gear shift position may comprise identifying a movement from the current gear shift position to the new gear shift position Alternatively or additionally, identifying an intention to change gear shift position to a new gear shift position may comprise one or more of (i) identifying contact of the driver's hand with the gear shift (whereby the contact may be considered an indication to move the gear shift), (ii) identifying a change of pressure at the gear shift above a predefined press (whereby the change of pressure may be considered an indication to move the gear shift), (iii) identifying an approaching movement of the driver towards the gear shift (whereby the approaching movement may be considered an indication to move the gear shift), and (iv) identifying a temperature change at the gear shift (whereby the temperature change may be considered an indication of the driver to change the gear shift).

In some examples of the method, executing a GSM autonomous control strategy may comprise one or more of (i) blocking the movement of the intention to change from the current gear shift position to the new gear shift position, (ii) increasing the difficulty of the intention to change from the current gear shift position to the new gear shift position, and (iii) vibrating the GSM.

In yet another aspect, a device for controlling vehicle gear shifting at a GSM is disclosed. The device may identify a current gear shift position; identify an intention to change from the current gear shift position to a new gear shift position; and execute a GSM autonomous control strategy.

In some examples, the device may further transmit the identified movement intention to a TCM; receive a command from the TCM; and execute the received TCM command.

In yet another aspect, a computing system is disclosed. The computing system may comprise a memory and a processor, embodying instructions stored in the memory and executable by the processor, the instructions comprising functionality to execute a method of controlling vehicle gear shifting at a GSM, according to examples disclosed herein.

In yet another aspect, a computer program product is disclosed. The computer program product may comprise program instructions for causing a computing system to perform a method according to some examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio.

When the computer program is embodied in a signal that may be conveyed directly by a cable or other device, the carrier may be constituted by such cable or other device.

Alternatively, the carrier may be an integrated circuit in which the computer program is embedded, the integrated circuit being adapted for performing, or for use in the performance of, the relevant methods.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
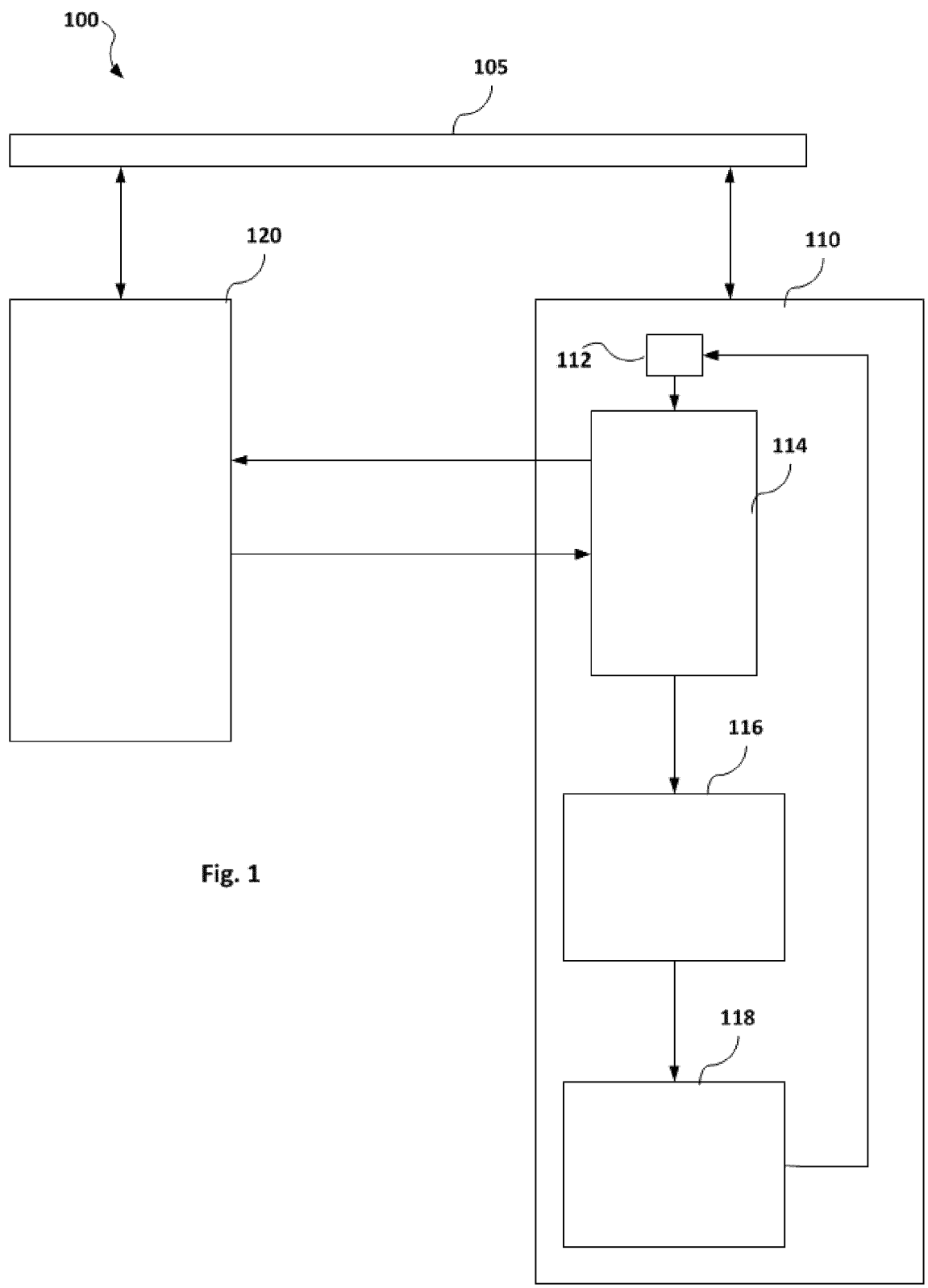
FIG. 1 schematically illustrates a powertrain architecture with a TCM master and a GSM slave configuration.

FIG. 1 schematically illustrates a typical powertrain architecture. Powertrain 100 comprises GSM 110, TCM 120 and a bus 105. In typical powertrains, such as powertrain 100, the GSM 110 receives status data (e.g. Key Status) and/or gear data from the bus 105. The data received may comprise the gear presently engaged, an indication of a gear change or an intention of a gear change. A movement detector 112 identifies a gear shift movement intention. The GSM 110 in traditional powertrain systems comprises a slave unit 114 that receives the status or gear data and retransmits it to the TCM 120. The TCM 120 in traditional powertrain systems is a master unit that receives the transmitted data and processes the data to verify that the requested change is allowable. Then the TCM 120 master unit may send an actuation command to the GSM slave unit 114. This command may comprise instructions to allow (or not) shifting based on the gear request. The slave unit 114 may then instruct a haptic HMI 116 that may be a shift-by-wire (SBW) haptic HMI, to act accordingly. If the gear shifting is allowable then the gear shift mechanism 118 may be enabled and the new gear shift position may be registered. Otherwise the haptic HMI 116 may lock, detent or detect end of travel.

Figure 2A:
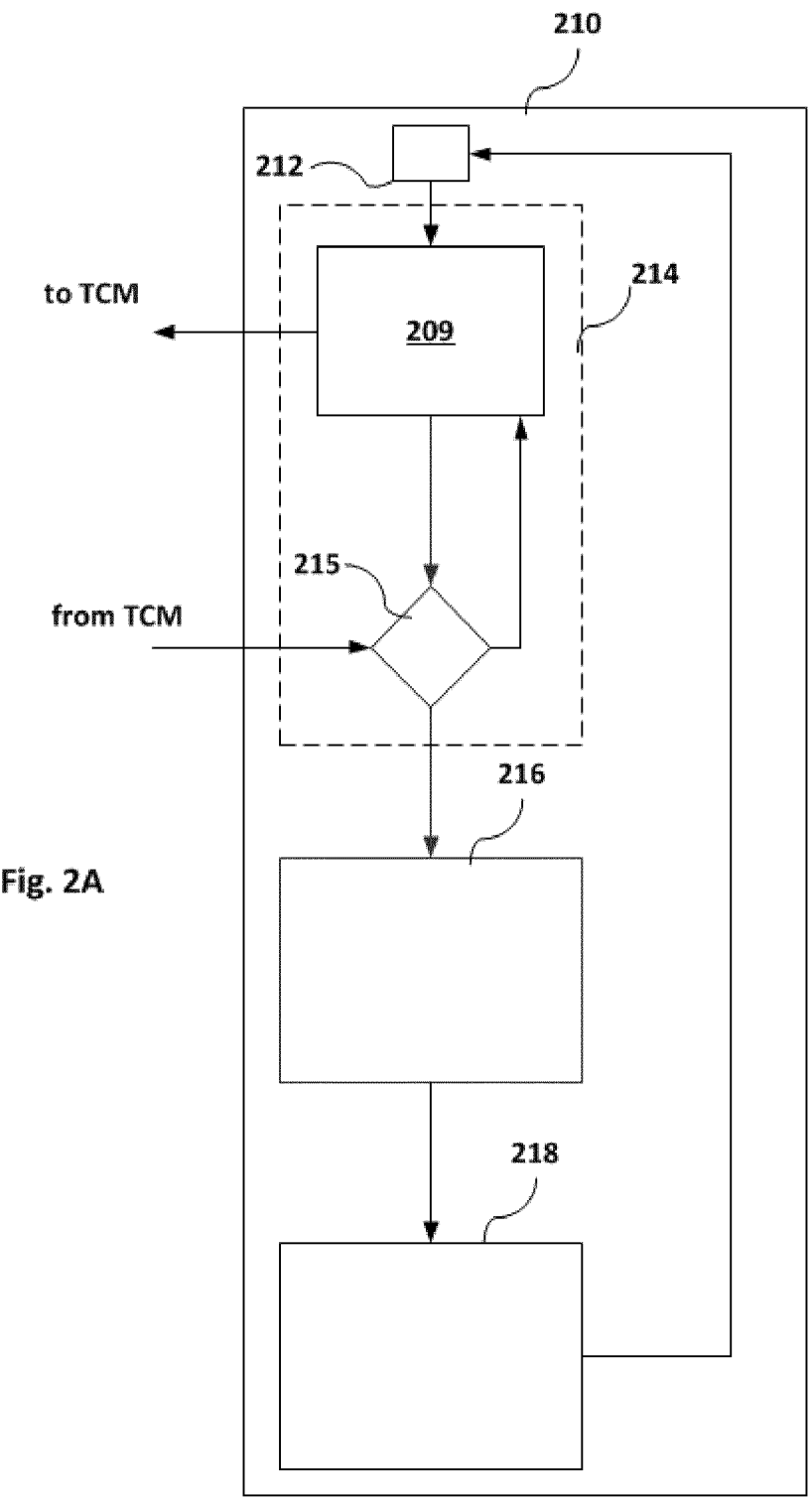
FIG. 2A schematically illustrates a GSM according to an example.

FIG. 2A schematically illustrates a proposed GSM 210 according to an example. The proposed GSM 210 may comprise a GSM controller 214, an intention detector 212 coupled to the GSM controller 214 and to a gear shifting mechanism 218, to detect a gear shift intention of a driver at the gear shifting mechanism 218. The proposed GSM 210 may further comprise haptic HMI 216, in communication with the GSM controller 214. The GSM controller 214 may comprise a communication interface 209 to communicate with a TCM 220 (shown in FIG. 2B) and a decision module 215. The decision module 215 may monitor signals from the TCM 220. When no message or command is received from the TCM 220, the decision module 215 may instruct the haptic HMI 216 based on a GSM autonomous control strategy. When a message or command is received from the TCM 220, the decision module 215 may instruct the haptic HMI 216 to apply a TCM strategy. The haptic HMI 216 may be configured to control the gear shifting mechanism 218 based on instructions received from the GSM controller 214 between detection of the gear shift intention and until the GSM controller 214 receives an actuation signal from the TCM 220.

Figure 2B:
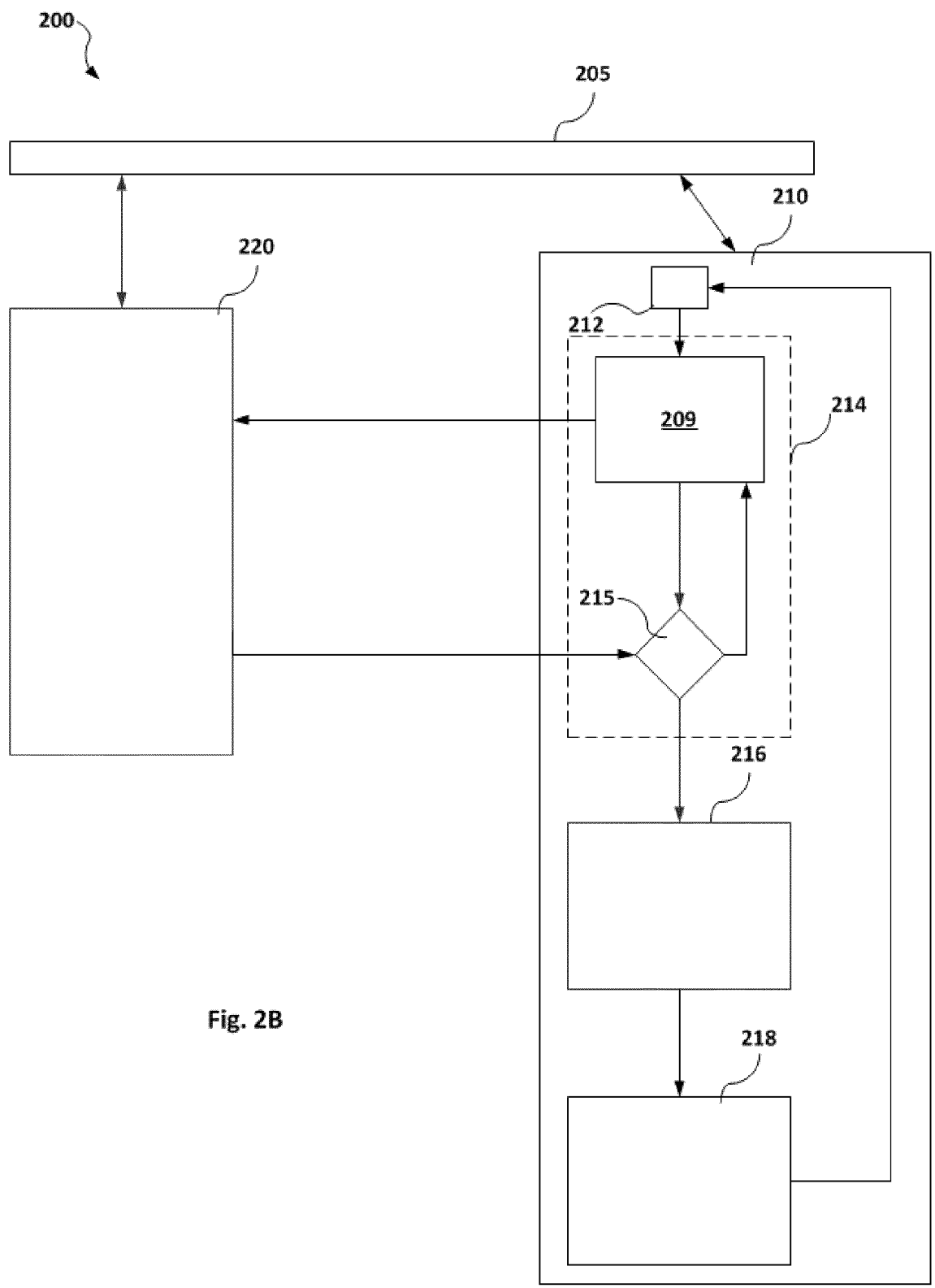
FIG. 2B schematically illustrates a powertrain architecture according to an example.

FIG. 2B schematically illustrates a powertrain architecture according to an example. Powertrain 200 may comprise GSM 210, TCM 220 and a bus 205. The GSM 210 may receive status data (e.g. Key Status) and Gear data from bus 205. Gear data may comprise the gear presently engaged and a gear request. An intention detector 212 may receive the gear shift request from the gear shift mechanism 218 and identify a gear shift intention. The GSM 210 may comprise a GSM controller 214 to receive the gear data and transmit to the gear data to the TCM 220. The GSM controller 214 may comprise a communication interface 209 to communicate with the TCM 220 (shown in FIG. 2B) and a decision module 215. The TCM 220 may process the gear data and decide on further action based on the allowability of the gear request. In the meantime, the GSM controller 214 may command the haptic HMI 216 until the TCM 220 command, to allow or not shifting based on the gear request, arrives. The haptic HMI 216 may lock, detent or detect end of travel. If the gear shifting is allowable then the gear shift mechanism 218 may be enabled and the new gear shift position may be registered.

The proposed GSM 210 may have functions of a TCM 220 master that a GSM slave does not have. The proposed GSM 210 may require master related functions to be able to actuate in real time to changes in different sensors and vehicle information and follow an internal GSM autonomous strategy independently from the TCM 220 master internal strategy. The proposed GSM 210 may have HMI mechanisms to provide haptic feedback to the driver in real time, i.e. in less than 30 ms from when the driver starts to make a movement that may not be allowed due to the vehicle's current conditions. The proposed GSM 210 may transmit gear intention information to the TCM 220 through different transmission systems (e.g. CAN, LIN, electrical signals, etc.) to inform the TCM 220 that the driver may be starting to make a prohibited movement before the movement is confirmed or completed. Thus, the proposed GSM 210 may be required to perform master related functions for a limited time. This limited time may be defined as the total time it takes to the driver to finish a movement in a traditional GSM, to the traditional GSM slave to process this change, to send this change to the TCM 220, to the TCM to react to this new information, to the TCM to transmit a new command to the GSM 210 and to the GSM 210 to execute such a command. The proposed GSM 210 may provide the master related functions from the moment the GSM 210 detects a prohibited change in the system until the GSM 210 receives a command from the TCM 220 through any information transmission channel (CAN, LIN, electrical signals, etc.). When the command is received from the TCM 220, the GSM 210 may stop any master related functions and may switch to a slave mode executing TCM 220 received commands.

Figure 3:
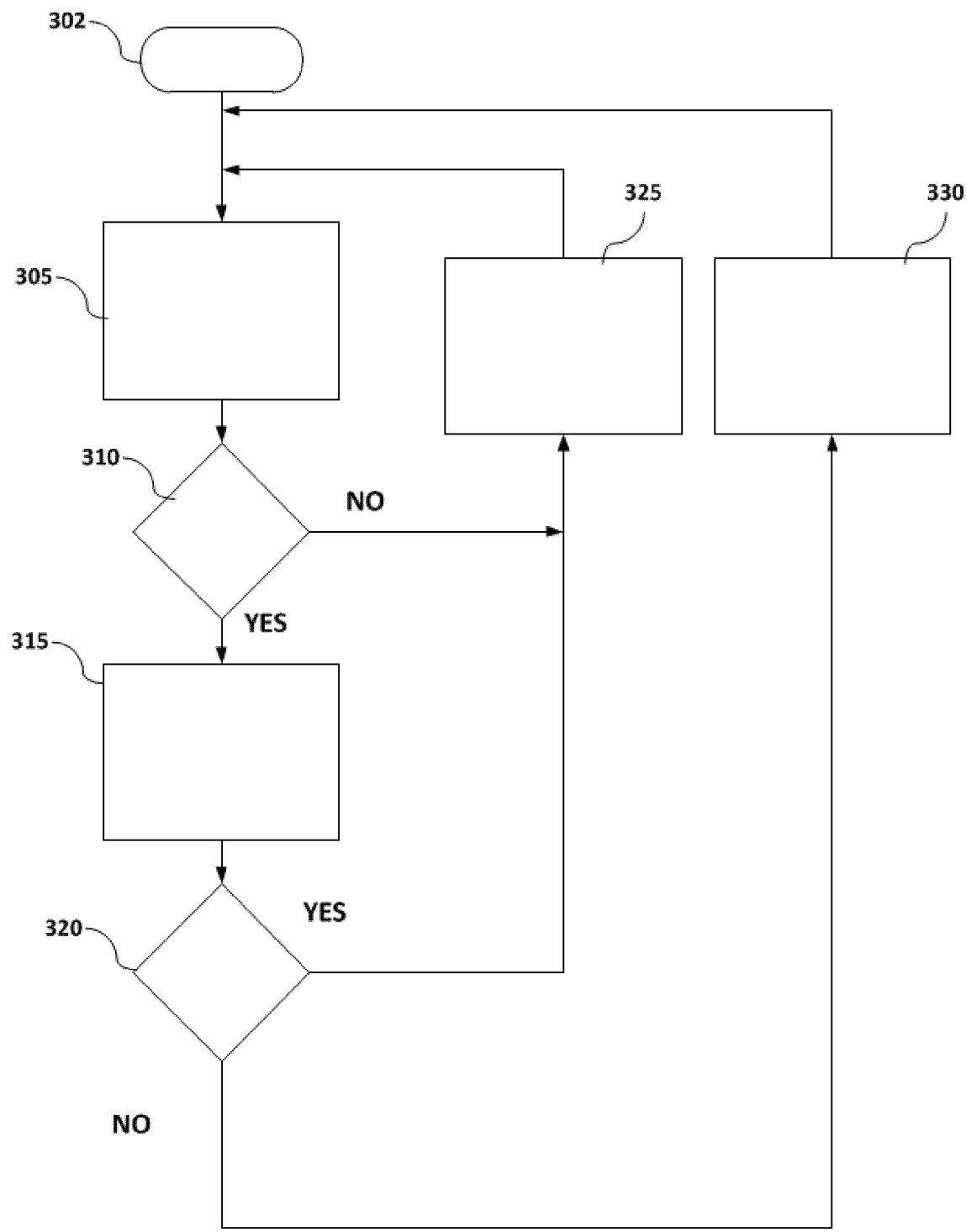
FIG. 3 schematically illustrates a flowchart of a GSM algorithm according to an example.

FIG. 3 schematically illustrates a flowchart of a GSM algorithm according to an example; The process may start at block 302. During a first processing block 305, sensor data may be acquired and the position of the gear shift may be detected. Furthermore, an update of a gear request status may be sent to the TCM 220. In decision block 310, the GSM 210 may address the following question: "Has a new small movement at the gear shift mechanism 218 been detected?". If the answer is yes, i.e. if a new small movement in GSM has been detected, then in processing block 315, which corresponds to vehicle information management block, an update of a gear intention status may be sent to the TCM 220. A "small movement" may be defined as a change in sensor value within a range between the stability value of the sensor (sensor intrinsical drift value) and a percentage movement between 1% and 10% (e.g. 5%) of the sensor movement between current position and contiguous position. Final value within previous range may be determined in each specific system based on physical and mechatronical characteristics, long term actuation analysis, thermal drifts, etc.

Then in decision block 320, it may be checked if the TCM 220 has sent a command related to the current gear intention or whether the GSM autonomous time for current gear intention has ended. If the answer to at least one of the questions is yes, then the process may continue to processing block 325. The process may also continue to processing block 325 when the answer to decision block 310 is no, i.e. when no new small movement in GSM has been detected. In processing block 325 a haptic control command received from the TCM 220 may be executed. Now if the answer to decision block 320 is negative for both questions, then the GSM 210 may execute an autonomous haptic control strategy.

Figure 4A:
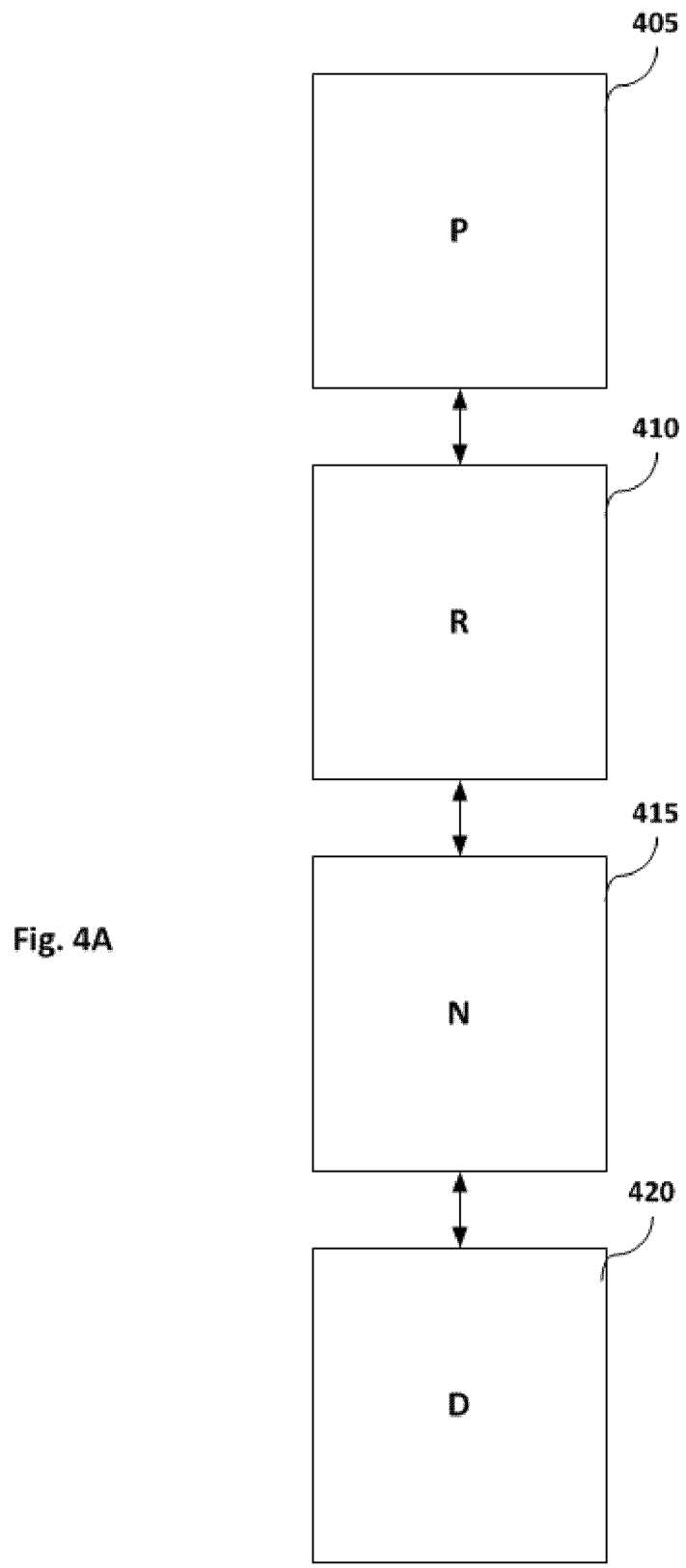
FIG. 4 schematically illustrates a shifting scenario in a multistable GSM.

FIG. 4A schematically illustrates a shifting scenario in a multi-stable GSM. According to this shifting scenario, a straight shifting pattern may be employed with four stable positions 405, 410, 415 and 142 (P, R, N and D, respectively). Shifting is possible from P to R, from R to P or N, from N to R or D and from D to N. An HMI haptic mechanism may be instructed by the GSM controller to block an intended movement (change) under certain conditions. This is summarized in the following table:

| Current Position | Vehicle Speed | Direction | Position not allowed | HMI haptic feedback |
|---|---|---|---|---|
| Reverse (R) | Above 3 Km/h | Backward | Park (P) | HMI haptic mechanism blocks the intended movement. Due to this the intended new position is never selected and engaged. |
| Neutral (N) | Above 3 Km/h | Forward | Reverse (R) | |
| Neutral (N) | Above 3 Km/h | Backward | Drive (D) | |

Under this scenario, the HMI haptic mechanism may employ a block mechanism using a solenoid controlled through a PWM signal. The GSM may employ a PWM controlled solenoid as HMI mechanism to provide haptic feedback to the driver in real time (under 30 ms). The haptic feedback to the driver may be force feedback. Force feedback may be applied in two situations:

A. Force feedback that may block an invalid driver movement.

B. Force feedback that may apply additional effort to a driver movement (but does not block the movement).

Force feedback to block (case A) may be activated when an invalid movement is detected. Force feedback to apply additional effort (case B) may be activated when a high speed movement is detected. Force feedback for the additional effort (case B) may be higher the closer the driver's movement is to an invalid movement. The HMI haptic mechanism may have the following characteristics:

The solenoid may be controlled to actuate from OFF (0% of PWM duty cycle) to Block (100% of PWM duty cycle).

Full activation (100%) of the solenoid may be used to block a movement (case A).

The Solenoid may be activated partially applying an intermediate PWM duty cycle between 1% and 99%. The higher duty value may be set the higher the effort applied by the solenoid will be, thus making the driver movement more difficult.

Partial activation (1% to 99%) of the solenoid may be used to increase the effort of a movement (case B)

Force feedback of the solenoid may require GSM Real Time actuation to provide to the driver a clear and understandable feedback that may improve the HMI Quality Perceived of the overall HMI mechanism. With no GSM Real Time actuation (>100 ms), the HMI mechanism reaction time may not be able to provide to the driver a clear and understandable feedback.

Figure 4B:
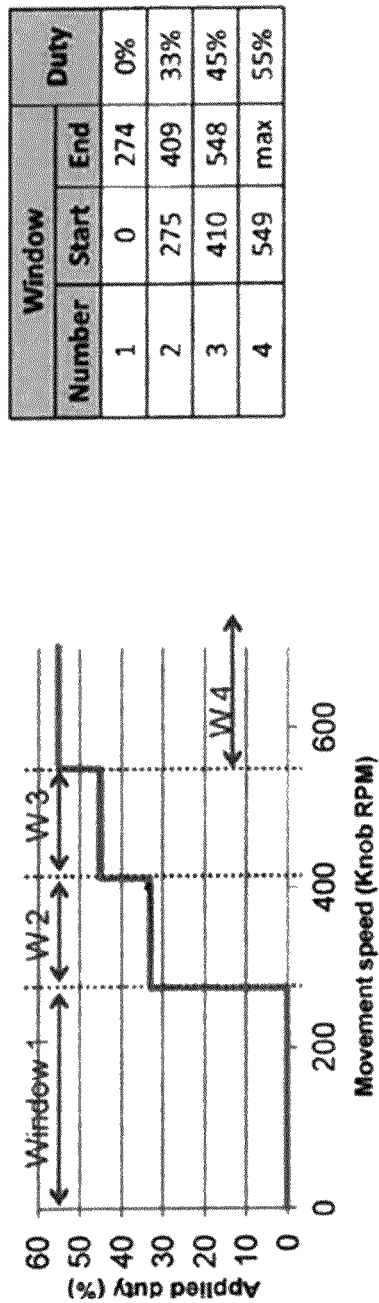

The GSM may apply an autonomous control strategy. According to this strategy, the GSM system may define a "Small movement" as the stability value of the sensor at a worst condition (which may represent a fraction of all movements from one position to the contiguous position). When the GSM detects a small movement in the direction to an invalid movement (due to current position and vehicle conditions), the CSM may apply a PWM duty cycle of 100% to block the movement in real time, thus not allowing the driver to physically enter in the invalid contiguous position (case A). In order to apply an additional effort (case B) in real time, the GSM may implement a speed detection algorithm. The speed detection algorithm may be implemented by a Proportional-Derivative (PD) controller. When a high speed movement is detected the GSM may set an intermediate PWM duty cycle to the solenoid based on the speed and distance to an invalid movement. This PWM duty cycle may add additional effort to the movement to make the execution of the movement more difficult to the driver and also may slow down this high speed movement. Specific values of PWM duty cycle for the additional effort (case B) may be defined in tables that depend on speed and distance. FIG. 4B illustrates a graphic showing an example of Duty versus Speed for a distance to an invalid movement of two shifter positions (D→R or R→D).

Figure 5:
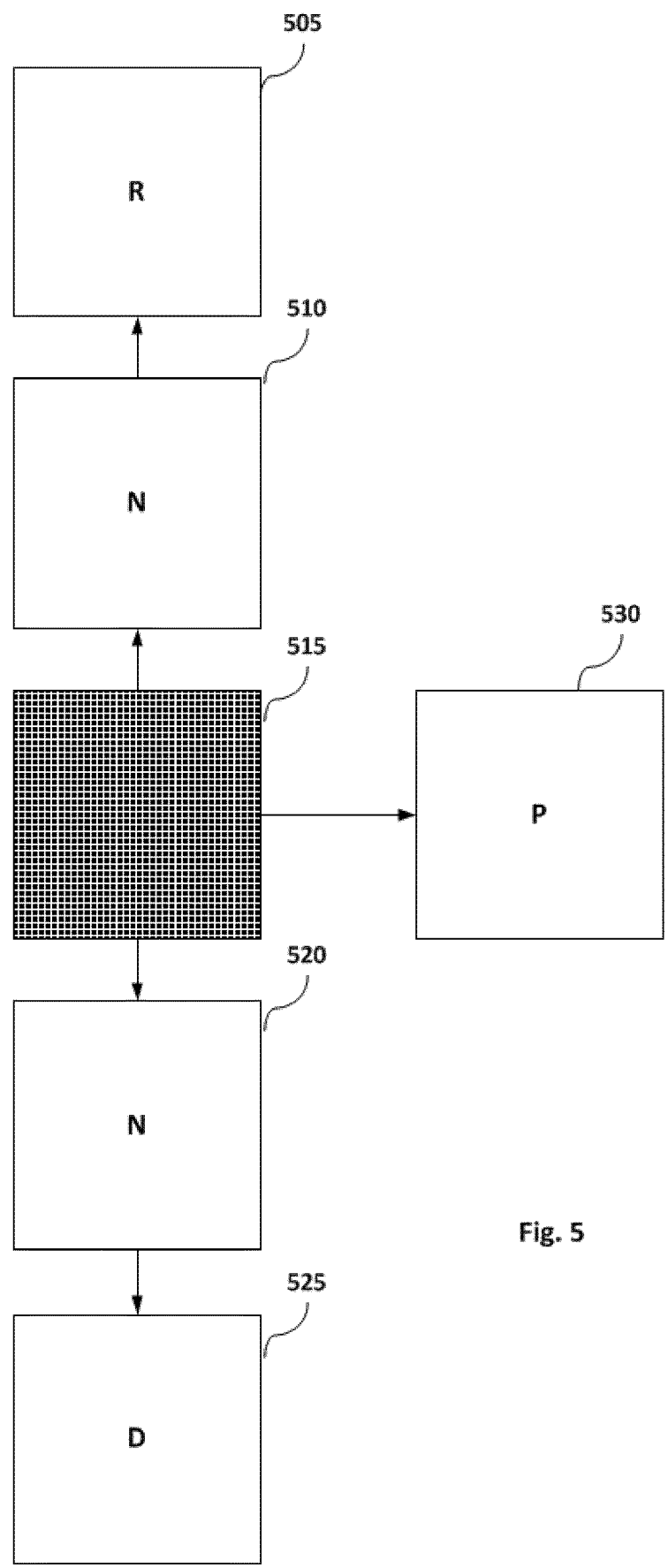
FIG. 5 schematically illustrates a shifting scenario in a monostable GSM.

FIG. 5 schematically illustrates a shifting scenario in a monostable GSM. According to this shifting scenario, a non-straight shifting pattern may be employed with only one stable position 515 (in grey) and five other non-stable positions 505, 510, 520, 525 and 530 (R, N, N, D, and P, respectively). An autonomous HMI haptic mechanism may vibrate until vehicle conditions to enter new position are met and then the selected position is engaged. This is summarized in the following table:

| Current Position | Vehicle Speed | Direction | Position not allowed | HMI haptic feedback |
|---|---|---|---|---|
| Reverse (R) | Above 3 Km/h | Backward | Park (P) | HMI haptic mechanism vibrates until vehicle conditions to enter new position are met and then the selected position is engaged. |
| Reverse (R) | Above 3 Km/h | Backward | Drive (D) | |
| Neutral (N) | Above 3 Km/h | Forward | Park (P) | |
| Neutral (N) | Above 3 Km/h | Forward | Reverse (R) | |
| Neutral (N) | Above 3 Km/h | Backward | Park (P) | |
| Neutral (N) | Above 3 Km/h | Backward | Drive (D) | |

| Current Position | Vehicle Speed | Direction | Position not allowed | HMI haptic feedback |
|---|---|---|---|---|
| Drive (D) | Above 3 Km/h | Forward | Park (P) | |
| Drive (D) | Above 3 Km/h | Forward | Reverse (R) | |

This table may be valid for most of cases as most OEMs follow similar strategy and inputs. Some OEMs may add some additional positions in the shifter but almost all are derivatives of Drive like: D1, D2, D3, D4, D5, Sport (S) or Low (L). The other positions of the shifter could be related with Drive but for a manual change of velocity gear, e.g. Manual+ (M+) and Manual− (M−).

The possible algorithm inputs are the following:
Algorithm inputs (all possible)
  Vehicle speed
  Transmission gear engaged
  Key status
  Brake pedal
  Paddles
  Seatbelt
  Door switch
  Day/Night condition
  Interior dimming level Further to that, the vehicle's speed and the current transmission gear that is engaged or the status of engagement may be input to the GSM controller.

Figure 6:
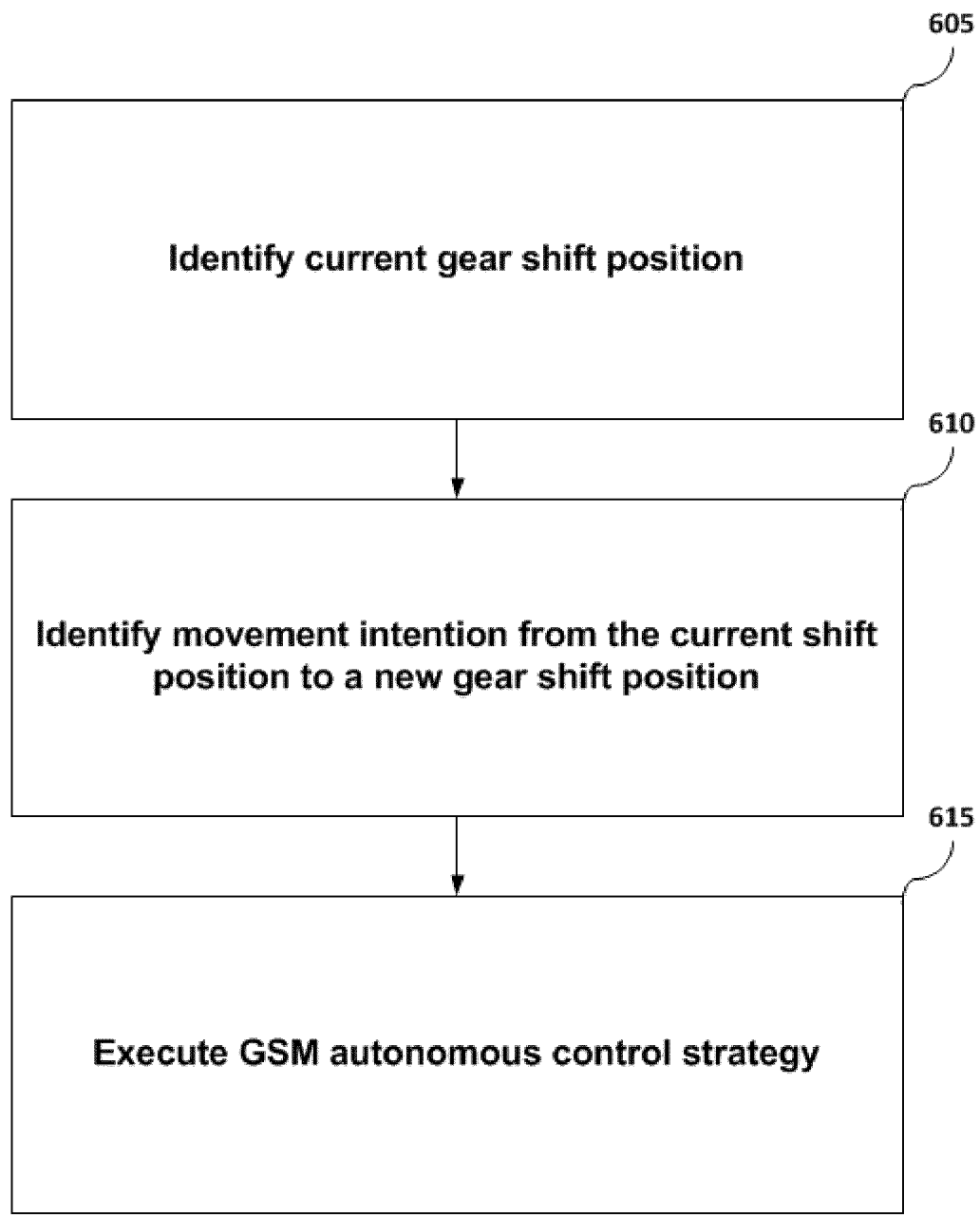
FIG. 6 schematically illustrates a flowchart of a method of controlling vehicle gear shifting at a GSM according to an example.

FIG. 6 schematically illustrates a flowchart of a method according to an example. In block 605, a current gear shift position is identified. In block 610 an intention to change shift position to a new gear shift position is identified. In block 615, a GSM autonomous control strategy is executed.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Further, although the examples described with reference to the drawings comprise computing apparatus/systems and processes performed in computing apparatus/systems, the invention also extends to computer programs, particularly computer programs on or in a carrier, adapted for putting the system into practice.

The invention claimed is:

1. A Gear Select Module (GSM) comprising:
a gear shifting mechanism, comprising a gear shifter;
a GSM controller;
an intention detector, coupled to the GSM controller, to detect an intention of a driver to change the gear shift of the gear shifting mechanism; and
a haptic human machine interface (HMI), in communication with the GSM controller;
wherein the GSM controller is configured to autonomously instruct the haptic HMI to control the gear shifting mechanism between detection of the gear shift change intention and until the GSM controller receives an actuation signal from a transmission control module (TCM), and
wherein the haptic HMI is controllable through a pulse width modulation (PWM) signal.

2. The GSM according to claim 1, wherein the GSM controller is configured to transmit the detected gear shift change intention to the TCM and receive the actuation signal.

3. The GSM according to claim 1, wherein the haptic HMI comprises an actuator.

4. The GSM according to claim 1, wherein the gear shifting mechanism is controllable through the haptic HMI between an off position corresponding to 0% of a duty cycle of the PWM signal and a block position corresponding to 100% of the duty cycle of the PWM signal.

5. The GSM according to claim 1, wherein the GSM controller comprises a table of prohibited position shift definitions.

6. A method of controlling vehicle gear shifting at a Gear Select Module (GSM), comprising:
identifying a current gear shift position;
identifying a change intention from the current gear shift position to a new gear shift position;
executing a GSM autonomous control strategy between detection of the gear shift change intention and until reception of an actuation signal from a transmission control module (TCM);
transmitting the identified change intention to the TCM;
receiving a control strategy from the TCM; and
switching from the GSM autonomous control strategy to the control strategy when a TCM control strategy is received.

7. The method according to claim 6, wherein identifying an intention to change gear shift position to a new gear shift position comprises identifying at least one or more of (i) identifying a movement from the current gear shift position to the new gear shift position, (ii) identifying a contact of a driver with the gear shift, (iii) identifying an approaching movement towards the gear shift, (iv) identifying a temperature change at the gear shift, and (v) identifying a change of pressure at the gear shift.

8. A computer program product embodied in a non-transitory computer readable medium that is programmed for controlling vehicle gear shifting at a Gear Select Module (GSM), the computer-program product comprising instructions for:
identifying a current gear shift position;
identifying a change intention from the current gear shift position to a new gear shift position; and
executing a GSM autonomous control strategy between detection of the gear shift change intention and until reception of an actuation signal from a transmission control module (TCM).

9. The computer program product of claim 8, further comprising instructions for:
   transmitting the identified change intention to the TCM;
   receiving a command from the TCM; and
   switching from the GSM autonomous control strategy to a TCM control strategy when the TCM control strategy is received.

10. The computer program product of claim 8, wherein the instructions for identifying a change intention comprises instructions for identifying the change intention from the current gear shift position to the new gear shift position as a prohibited change or for identifying a prohibited vehicle state for the change intention.

11. The computer program product of claim 10, wherein the instructions for identifying the change intention from the current gear shift position to the new gear shift position as a prohibited change intention includes instructions for looking up a table with prohibited gear shift change position pairs.

12. The computer program product of claim 10, wherein the instructions for identifying a prohibited vehicle state for the change intention includes instructions for identifying a vehicle speed.

13. The computer program product of claim 8, wherein the instructions for identifying an intention to change shift position to a new gear shift position includes instructions for identifying at least one of (i) a movement from the current gear shift position to the new gear shift position, (ii) a change of pressure in the gear shift, and (iii) a change of temperature in the gear shift.

14. The computer program product of claim 8, wherein the instructions for executing a GSM autonomous control strategy includes instructions for one or more of (i) blocking the change from the current gear shift position to the new gear shift position, (ii) adding additional effort to change from the current gear shift position to the new gear shift position, and (iii) vibrating the GSM.

15. A method of controlling vehicle gear shifting at a Gear Select Module (GSM), comprising:
   identifying a current gear shift position;
   identifying a change intention from the current gear shift position to a new gear shift position; and
   executing a GSM autonomous control strategy between detection of the gear shift change intention and until reception of an actuation signal from a transmission control module (TCM),
   wherein identifying the change intention comprises identifying an intention to change from the current gear shift position to the new gear shift position as a prohibited change intention or identifying a prohibited vehicle state for the change intention.

16. The method according to claim 15, wherein identifying a change intention as the prohibited change intention comprises looking up a table with prohibited gear shift change position pairs.

17. The method according to 32, wherein identifying the prohibited vehicle state for the change intention comprises identifying a vehicle speed.

18. The method according to claim 15, wherein identifying the intention to change gear shift position to a new gear shift position comprises identifying at least one or more of (i) identifying a movement from the current gear shift position to the new gear shift position, (ii) identifying a contact of a driver with the gear shift, (iii) identifying an approaching movement towards the gear shift, (iv) identifying a temperature change at the gear shift, and (v) identifying a change of pressure at the gear shift.

19. A method of controlling vehicle gear shifting at a Gear Select Module (GSM), comprising:
   identifying a current gear shift position;
   identifying a change intention from the current gear shift position to a new gear shift position; and
   executing a GSM autonomous control strategy between detection of the gear shift change intention and until reception of an actuation signal from a transmission control module (TCM),
   wherein executing the GSM autonomous control strategy comprises one or more of (i) blocking the change from the current gear shift position to the new gear shift position, (ii) increasing the difficulty to change from the current gear shift position to the new gear shift position, and (iii) vibrating the GSM.

20. The method according to claim 19, wherein identifying an intention to change gear shift position to a new gear shift position comprises identifying at least one or more of (i) identifying a movement from the current gear shift position to the new gear shift position, (ii) identifying a contact of a driver with the gear shift, (iii) identifying an approaching movement towards the gear shift, (iv) identifying a temperature change at the gear shift, and (v) identifying a change of pressure at the gear shift.

* * * * *